3,210,280
CHLORINATED SULFURIZED ESTERS
Ernest J. Rich, Jr., Edison, N.J., assignor to FMC Corporation, a corporation of Delaware
No Drawing. Filed Mar. 22, 1961, Ser. No. 97,447
9 Claims. (Cl. 252—48.4)

This invention relates to novel chlorinated sulfurized esters. More particularly, the invention relates to chlorinated sulfurized diesters of alkenylsuccinic acids.

It has long been known that many compounds containing sulfur, chlorine, or both have value as lubricating oil additives. Various attempts have been made to prepare new additives by reacting unsaturated organic compounds with sulfur and/or chlorine whereby these substituents are added across the double bond. In a copending application of Miller, Latourette, and Rich, Serial No. 37,829, filed June 22, 1960 and now U.S. Patent 3,136,748, a method is taught for preparing novel lubricating oil additives by sulfurizing diesters of alkenylsuccinic acids under conditions which result in the evolution of hydrogen sulfide.

It is the object of this invention to provide chlorinated sulfurized diesters of alkenylsuccinic acids.

Another object is to provide new and useful lubricating oil additives having improved wear properties and load carrying capacity.

These and other objects will become apparent from the following description of this invention.

It has now been found that the reaction products of chlorine with sulfurized diesters of alkenylsuccinic acids in which the alkenyl group contains at least 3 carbon atoms, the sulfurized diesters contain 5–30% by weight of chemically bound sulfur, and the reaction products contain 1–15% by weight of chemically bound sulfur and 5–30% by weight of chemically bound chlorine, have outstanding properties as lubricating oil additives. These reaction products, when compared with the sulfurized diester intermediates described in the copending application referred to above, have good wear prevention properties and unexpectedly superior load carrying capacities. Moreover, the chlorinated products are substantially less corrosive to copper and lighter in color than the corresponding sulfurized intermediates.

The improved products of this invention are prepared by chlorinating sulfurized diesters of alkenylsuccinic acids in which the alkenyl radical contains at least 3 carbon atoms. An alkenyl group is defined as an aliphatic or alicyclic radical containing an olefinic double bond. The precise nature of the alkoxy radical is not critical, since the sulfurization and chlorination reactions proceed, under the conditions disclosed herein, in a manner independent of the ester group.

The diesters of alkenylsuccinic acids may be prepared by known methods, such as by reacting a monohydric or dihydric alcohol, or a monohydric or dihydric phenol with an alkenylsuccinic anhydride. The alkenylsuccinic anhydride is readily prepared by reacting an olefin containing at least 3 carbon atoms with maleic anhydride at elevated temperatures. In this reaction, a carbon and a hydrogen from the olefin add across the maleic double bond to form an olefinically unsaturated succinic anhydride.

Examples of olefins which are suitable for the preparation of alkenylsuccinic anhydrides include propylene and its polymers such as dipropylene, tripropylene, and tetrapropylene; isobutylene and polymers thereof such as diisobutylene and triisobutylene; higher olefins such as 2-methyl-1-butene, 2-methyl-2-butene, 3,4-dimethyl-2-pentene, 2,2,3-trimethyl-1-butene, octene-1, 2-methyl-1-heptene, 2,4,4-trimethyl-1-pentene, 2,4,4-trimethyl-2-pentene, nonene-1, 2-methyl-1-octane, 4-methyl-4-octene, 2,4-dimethyl-3-heptene, dodecene-1, 2-methyl-1-pentadecene, 2-methyl-3-hexyl-1-nonene, 3-methyl-4-hexyl-5-tridecene, and mixtures containing these olefins. Cyclic olefins such as cyclohexene, cyclopentene, vinylcyclohexene, limonene, alpha-pinene, and dicyclopentadiene are also suitable for reaction with maleic anhydride.

The esterification of the alkenylsuccinic acid or acid derivative may be carried out under standard esterification conditions, such as by reaction with an alcohol or alkyl halide, normally at elevated temperatures. The esterifying group may be derived from a monohydric alcohol or phenol, including aliphatic alcohols such as methanol, ethanol, n-propanol, isopropanol, n-butanol, isobutanol, n-amyl alcohol, n-hexanol, 2-methyl-1-pentanol, 4-methyl-2-pentanol, 2-ethyl-1-hexanol, 3,5,5-trimethyl-1-hexanol, oxo-alcohols such as those produced by reacting diisobutylene with carbon monoxide and hydrogen, isodecanol, stearyl alcohol; alkoxy alkanols such as 3-methoxybutanol and 2-butoxyethanol; alicyclic alcohols such as furfuryl alcohols, cyclohexanol, 2-methylcyclohexanol, and 2,4,6-trimethyl-1-cyclohexanol; aralkanols such as benzyl alcohol and dimethylbenzyl alcohol; and aromatics including phenol, p-cresol, and xylenol. It is preferable to use the higher molecular weight alcohols, since the esters formed from the lower alkyl alcohols tend to be less stable during sulfurization. Dihydric alcohols may also be used in the esterification reaction, resulting in a cyclic diester formed by intramolecular esterification, or a polyester formed by intermolecular esterification. Polyhydroxy compounds such as ethylene glycol, propane-1,3-diol, butane-1,3-diol, butane-1,4-diol, pentane-1,5-diol, diethylene glycol and 2-ethylhexane-1,3-diol are typical polyols suitable for producing cyclic diesters or polyesters.

The alkenylsuccinate is sulfurized by reaction with elemental sulfur at a sulfur to diester mole ratio in the range of about 4:1 to 15:1; a mole of sulfur representing one unit atomic weight, and a mole of diester being a unit molecular weight. Molar ratios below about 4:1 result in products containing less than the preferred quantity of sulfur. For best results, the quantity of sulfur employed should be in excess of the amount which is desired to be incorporated into the intermediate ester. Such excesses have no detrimental effect upon the product, and any unreacted sulfur may be recovered, and reused in the reaction, if desired. Preferably, about 5 to 8 moles of sulfur are present for each mole of diester to be sulfurized.

The sulfurization reaction requires temperatures high enough to produce a substantial evolution of hydrogen sulfide. Initiation of the reaction generally occurs at temperatures just above 200° C. As the molecular weight of the diester being sulfurized increases, particularly as the size of the alkenyl group increases, somewhat higher temperatures are required for initiation of the reaction. The reaction is preferably carried out at temperatures in excess of the initiation temperature, in order to provide a satisfactory rate of reaction. The maximum temperature is governed by the stability of the sulfurized product. Carbonization of the product may become appreciable, at temperatures in excess of about 260° C., if the product is exposed to these temperatures for long periods of time. However, temperatures as high as about 500° C. can be tolerated for brief periods. The preferred temperature is in the range of about 205–260° C.

The sulfurization reaction is suitably carried out by mixing sulfur and the diester in an appropriate reaction vessel, and heating to the reaction temperature. The mixture is preferably stirred or otherwise agitated during the reaction. The duration of the reaction will depend upon the temperature employed and the extent of sulfurization desired. As a rule, each mole of hydrogen sulfide evolved roughly corresponds to the incorporation of about one mole of chemically bound sulfur. For best results, about two moles of hydrogen sulfide should be evolved for each mole of alkenylsuccinate present. When operating within the preferred temperature range, this may take from 1–15 hours.

The sulfurized product is believed to be a mixture of materials having varied sulfur contents. The major portion of the product mixture is an oil. Small amounts of insoluble materials, believed to be high in sulfur content, may also be formed during the reaction. These insoluble materials are readily removed by diluting the sulfurization product with hexane, and filtering out the solids. Highly colored components and additional components insoluble in mineral oil may be removed by diluting the sulfurized product with benzene, treating with activated carbon, and filtering. The oil-soluble portion of the mixture should contain at least about 5%, and preferably 10–30% by weight of chemically bound sulfur.

The chlorination reaction is carried out by dissolving the sulfurized diester in a suitable solvent and bubbling chlorine through the solution. Any solvent for the sulfurized diester which is inert to chlorine under the reaction conditions may be used. Examples of these solvents include saturated aliphatic hydrocarbons such as pentane, hexane, heptane and octane, and aromatic hydrocarbons such as benzene and chlorobenzene. It is not necessary to supply heat to the reaction, since the medium is generally warmed to a temperature in the range of about 30–80° C. by the heat of reaction.

The chlorination reaction should be continued until sufficient chlorine has been absorbed to provide a product having a chlorine content of at least about 5%. The rate at which the chlorine is bubbled through the solution is not critical, but will be governed by economic considerations, such as chlorine utilization and reaction time. Typically the chlorine is bubbled into the solution at the rate of 0.02–0.5 parts by weight of chlorine per part of sulfurized ester per minute.

The chlorination is preferably continued at least until the rate at which the chlorine is absorbed becomes relatively slow. Generally, this will occur after about 10 minutes. For best results, the chlorination should be continued for a total of 20–60 minutes. The total amount of chlorine passed into the system should be 1–6 parts by weight per part of sulfurized ester. As chlorine is absorbed by the sulfurized ester, there is a loss in the sulfur content of the ester. The final product preferably contains about 1–15% by weight of sulfur and 10–30% chlorine.

In many cases the chlorinated sulfurized alkenylsuccinates are not completely stable, but decompose over a period of time with the evolution of hydrogen chloride gas. It has been found that these products may be stabilized by the addition of 1–15% by weight of an organic compound containing an oxirane group. Mixtures containing 1,2-epoxyoctane and 2,3-epoxyoctane are especially effective.

The chlorinated sulfurized alkenylsuccinates produced herein are superior lubricating oil additives, with the particular advantage of greatly increasing the wear properties and the load carrying capacity of lubricating oils. They are also useful in improving the properties of cutting oils. These products have the additional advantage of being completely non-corrosive to copper.

The products of this invention are especially useful as additives for motor oils and gear-lubricants; that is, petroleum distillates boiling above 325° C. and having a viscosity greater than 50 seconds Saybolt Universal at 38° C. The addition of as little as about 0.1% of the chlorinated sulfurized diester to lubricating oils results in improved properties. No special advantages accrue from the presence of more than about 15% of the additive. Preferably, 1% to 10% of the chlorinated product is added to the lubricating oil.

The following examples, illustrating the preparation and use of typical chlorinated sulfurized alkenylsuccinates of this invention, are given without any intention that the invention be limited thereto. All parts and percentages are by weight.

EXAMPLE 1

Di-n-hexyl octenylsuccinate was prepared by reacting n-hexanol with octenylsuccinic anhydride (derived from the reaction of maleic anhydride and caprylene) in the presence of a catalytic amount of p-toluene sulfonic acid. The reaction was allowed to proceed for a period of 20 hours at a temperature in the range of 120–142° C. to give a yield of 95% of theory based upon the anhydride.

A mixture containing 196.2 g. of di-n-hexyl octenylsuccinate and 80.2 g. of elemental sulfur was charged to a reaction flask. The mixture was agitated and heated to 204° C. at which temperature the evolution of hydrogen sulfide gas began. Heating was continued for 1.4 hours at 204–223° C., during which time 22.8 l. of hydrogen sulfide were evolved. The batch was cooled, diluted with about 600 ml. of hexane, filtered, and vacuum stripped to remove the hexane. The product was then diluted with 600 ml. of benzene, slurried with activated carbon, filtered, and vacuum stripped to remove the benzene. One hundred fifty-four grams of a deep-red oil containing 16.4% chemically bound sulfur were obtained.

One hundred grams of the sulfurized product were dissolved in 500 ml. of benzene. Chlorine gas was bubbled into the solution at the rate of about 350 cc./min. The temperature of the solution rose to about 57° C., and the solution gradually lightened in color. After about 10 minutes, chlorine absorbtion slowed noticeably, however chlorination was continued for a total of 30 minutes. The chlorinated product was washed 3 times with one liter portions of water, and stripped to give 118 g. of a bland smelling red-brown oil containing 5.9% sulfur and 21.2% chlorine. Twelve grams of a mixture containing 1,2-epoxyoctane and 2,3-epoxyoctane were added to stabilize the product.

EXAMPLE 2

A mixture of 239.5 g. of diisohexyl nonenylsuccinate (derived from tripropylene) and 93.1 g. of sulfur was charged into a reaction flask, stirred, and slowly heated to 215° C. at which temperature hydrogen sulfide evolution began. Heating was continued for 1.9 hours at 215–235° C. during which time 26.5 l. of hydrogen sulfide were evolved. The product was cooled, diluted with 600 ml. of hexane, filtered, stripped, diluted with 750 ml. of benzene, slurried with activated carbon, filtered, and again stripped. One hundred thirty-seven and four-tenths grams of a red oil containing 12% of chemically bound sulfur were obtained.

Sixty-nine grams of the sulfurized product were dissolved in 500 ml. of benzene, and chlorine was bubbled into the solution at the rate of about 350 cc./min. The chlorination was continued for 30 minutes, during which period the temperature rose to 55° C. The chlorinated product was washed 3 times with one liter portions of water, and stripped to give 79.3 g. of a bland smelling red-brown oil containing 1.4% sulfur and 18.5% chlorine.

EXAMPLE 3

A mixture of 2045 g. of di-n-hexyl methallylsuccinate (derived from isobutylene) and 962 g. of sulfur was charged into a reaction flask, stirred, and slowly heated to 201° C. at which temperature hydrogen sulfide evolution began. Heating was continued for 6 hours at 201–210° C. The product was cooled, diluted with 6 l. of hexane, filtered, stripped, diluted with 6 l. of benzene, slurried with activated carbon, filtered, and again stripped. One thousand two hundred sixty-eight and five-tenths grams of a red oil containing 24.3% of chemically bound sulfur were obtained.

One hundred grams of the sulfurized product were dissolved in 500 ml. of benzene, and chlorine was bubbled into the solution at the rate of about 350 cc./min. The chlorination was continued for 30 minutes, during which the temperature rose to 65° C. The chlorinated product was washed 3 times with one liter portions of water, and stripped to give 116.6 g. of a bland smelling red-brown oil containing 7.9% sulfur and 24.9% chlorine.

EXAMPLE 4

A mixture of 198.3 g. of diisobutyl dodecenylsuccinate (derived from tetrapropylene) and 80.2 g. of sulfur was charged into a reaction flask, stirred, and slowly heated to 232° C. at which temperature hydrogen sulfide evolution began. Heating was continued for 1.5 hours at 232–236° C. during which time 22.9 l. of hydrogen sulfide were evolved. The product was cooled, diluted with 600 ml. of hexane, filtered, stripped, diluted with 800 ml. of benzene, slurried with activated carbon, filtered, and again stripped. One hundred twenty-one and six-tenths grams of a red oil containing 11.7% of chemically bound sulfur were obtained.

Sixty grams of the sulfurized product were dissolved in 500 ml. of benzene, and chlorine was bubbled into the solution at the rate of about 350 cc./min. The chlorination was continued for 30 minutes, while the temperature rose to 55° C. The chlorinated product was washed 3 times with one liter portions of water, and stripped to give 71.2 g. of a bland smelling red-brown oil containing 5.4% sulfur and 21.1% chlorine.

EXAMPLE 5

A mixture of 198.3 g. of di-n-hexyl octenylsuccinate (derived from diisobutylene) and 80.2 g. of sulfur was charged into a reaction flask, stirred, and slowly heated to 228° C. at which temperature hydrogen sulfide evolution began. Heating was continued for 1.3 hours at 228–235° C. during which time 22.8 l. of hydrogen sulfide were evolved. The product was cooled, diluted with 600 ml. of hexane, filtered, stripped, diluted with 600 ml. of benzene, slurried with activated carbon, filtered, and again stripped. One hundred fifty-nine grams of a red oil containing 15.4% of chemically bound sulfur were obtained.

Sixty grams of the sulfurized product were dissolved in 200 ml. of benzene, and chlorine was bubbled into the solution at the rate of about 350 cc./min. The chlorination was continued for 60 minutes. The chlorinated product was washed 3 times with 100 ml. portions of water, and stripped to give 75.9 g. of a bland smelling red-brown oil containing 9.9% sulfur and 13.9% chlorine.

EXAMPLE 6

A mixture of 243.4 g. of 2-ethylhexyl tolyl dodecenylsuccinate (prepared by esterifying the adduct of maleic anhydride and triisobutylene with 2-ethylhexanol and cresol) and 80.2 g. of sulfur was charged into a reaction flask, stirred and slowly heated to 208° C. at which temperature hydrogen sulfide evolution began. Heating was continued for 19.3 hours at 208–236° C. during which time 23 l. of hydrogen sulfide were evloved. The product was cooled, diluted with 600 ml. of hexane, filtered, stripped, diluted with 868 ml. of benzene, slurried with 144 g. of activated carbon, filtered, and again stripped. One hundred twenty-seven and three-tenths grams of a red oil containing 6.2% of chemically bound sulfur were obtained.

Ten grams of the sulfurized product were dissolved in 25 ml. of hexane, and chlorine was bubbled into the solution at the rate of about 350 cc./min. The chlorination was continued for a total of 10 minutes. The chlorinated product was washed 3 times with 50 ml. portions of water, and stripped to give a bland smelling red-brown oil containing 5.7% sulfur and 16.5% chlorine.

EXAMPLE 7

This example was carried out to determine the corrosiveness to copper of lubricating oils containing the chlorinated sulfurized alkenylsuccinates of this invention. Test solutions were prepared by dissolving 1% of various intermediate sulfurized alkenylsuccinates, prepared in the previous examples, in a naphthenic base petroleum distillate lubricating oil having a viscosity of 1120 seconds Saybolt Universal at 38° C. and containing no other additives. Similar solutions were made from the chlorinated sulfurized alkenylsuccinates. As described in ASTM designation D130–55T, samples of the oil were placed in test tubes, and a polished copper strip immersed in each of the oil samples. The test tubes were stoppered with vented corks and placed in a bath maintained at 100° C. After 3 hours, the copper strips were removed from the test tubes and compared with the ASTM Copper Strip Corrosion Standards. The following table specifies the data obtained, in which a value of 1(a) indicates substantially no corrosion, with the intensity of corrosion increasing from 1(a) to 4(c).

| Example | Sulfurized alkenylsuccinate | Copper strip test | |
|---|---|---|---|
| | | Before chlorination | After chlorination |
| 2 | Diisohexyl nonenylsuccinate | 4(c) | 1(a). |
| 3 | Di-n-hexyl methallylsuccinate | 4(c) | 1(a). |
| 4 | Diisobutyl dodecenylsuccinate (derived from tetrapropylene). | 4(a) | 1(a). |
| 6 | 2-ethylhexyl tolyl dodecenylsuccinate (derived from triisobutylene). | 3(b) | 1(a). |

EXAMPLE 8

This example was carried out to measure the effect of the products of this invention on the wear prevention properties and the load carrying capacity (Mean Hertz Load) of lubricating oils. The wear test was carried out in a Precision Scientific Company four-ball wear tester in accordance with the standard method developed by the Naval Research Laboratory, in which higher mean specific pressures indicate increased wear prevention properties. Three 0.5 inch diameter steel bearing balls were cleaned and clamped into the ball pot of the apparatus. A naphthenic base petroleum distillate lubricating oil, having a viscosity of 1120 seconds Saybolt Universal at 38° C. and containing no additives, was poured over the balls, and a fourth ball was clamped into the chuck above the ball pot. With an applied load of 7 kilograms, the fourth ball was rotated against the three stationary balls at the rate of 1800 revolutions per minute for a period of 2 hours, while the temperature was maintained at 80° C. The diameter of wear spots on the stationary balls was then measured, from which a mean specific pressure of 12,800 p.s.i. over the area of contact was calculated.

The load carrying capacity of the base lubricating oil was measured with the same instrument in accordance with Federal Test Method Standard 791, Method 6503, in which higher Mean Hertz Load values indicate increased load carrying capacity. Welding of the balls occurred at an applied load of 89 kilograms, and the Mean Hertz Load was found to be 9.8.

The wear prevention properties of mixtures containing 5% of various chlorinated sulfurized alkenylsuccinic diesters prepared in the previous examples and 95% of the base lubricating oil used above were determined in the same manner as set forth above. The load carrying capacity of the same diesters before and after chlorination was also measured as before. The results of these tests are summarized in the following table.

| Example | Sulfurized alkenylsuccinate | Wear resistance, mean specific pressure, p.s.i., after chlorination | Load carrying capacity | | | |
|---|---|---|---|---|---|---|
| | | | Applied load at weld, kg. | | Mean Hertz Load | |
| | | | Before chlorination | After chlorination | Before chlorination | After chlorination |
| | None | 12,800 | 89 | 89 | 9.8 | 9.8 |
| 1 | Di-n-hexyl octenylsuccinate (derived from caprylene). | 26,500 | 200 | 794 | 31.3 | 73.3 |
| 2 | Diisohexyl nonenylsuccinate. | 25,800 | 200 | 398 | 27.5 | 73.1 |
| 3 | Di-n-hexyl methallylsuccinate. | 33,680 | 282 | >794 | 40 | 104.9 |
| 4 | Diisobutyl dodecenylsuccinate. | 16,500 | 171 | 398 | 27.9 | 72.9 |
| 5 | Di-n-hexyl octenylsuccinate (derived from diisobutylene). | 33,600 | 224 | 708 | 34.1 | 71.7 |

From this table, it can be seen that the chlorinated sulfurized alkenylsuccinates of this invention substantially improve the wear prevention properties and load carrying capacity of lubricating oil. It can also be seen that the load carrying capacity of the ester after chlorination is markedly superior to that of the ester before chlorination.

While the products of this invention have been described and exemplified in such manner that one skilled in the art can readily understand and practice the invention, numerous other examples of chlorinated sulfurized alkenylsuccinic diesters are contemplated within the spirit of the invention and the scope of the following claims.

I claim:
1. The reaction product produced by bubbling chlorine through a sulfurized diester of an alkenylsuccinic acid formed by reacting
   (a) a diester of an alkenylsuccinic acid in which the ester radicals are derived from an alcohol selected from the group consisting of alkyl, alkoxyalkyl, alicyclic, aralkyl and aryl alcohols and the alkenyl radical contains at least 3 carbon atoms with
   (b) elemental sulfur at a temperature above 200° C. for a time sufficient to produce a substantial evolution of hydrogen sulfide whereby said sulfurized diester contains 5–30% by weight of chemically bound sulfur,
said reaction product containing 1–15% by weight of chemically bound sulfur and 5–30% by weight of chemically bound chlorine.

2. The reaction product produced by bubbling chlorine through a sulfurized dialkyl alkenylsuccinate formed by reacting
   (a) a dialkyl alkenylsuccinate in which the alkenyl radical contains at least 3 carbon atoms with
   (b) elemental sulfur at a temperature above 200° C. for a time sufficient to produce a substantial evolution of hydrogen sulfide whereby said sulfurized diester contains 10–30% by weight of chemically bound sulfur,
said reaction product containing 1–15% by weight of chemically bound sulfur and 10–30% by weight of chemically bound chlorine.

3. The reaction product produced by bubbling chlorine through a sulfurized di-n-hexyl octenylsuccinate formed by reacting
   (a) di-n-hexyl octenylsuccinate with
   (b) elemental sulfur at a temperature above 200° C. for a time sufficient to produce a substantial evolution of hydrogen sulfide whereby said sulfurized diester contains 10–30% by weight of chemically bound sulfur,
said reaction product containing 1–15% by weight of chemically bound sulfur and 10–30% by weight of chemically bound chlorine.

4. The reaction product produced by bubbling chlorine through a sulfurized diisohexyl nonenylsuccinate formed by reacting
   (a) diisohexyl nonenylsuccinate with
   (b) elemental sulfur at a temperature above 200° C. for a time sufficient to produce a substantial evolution of hydrogen sulfide whereby said sulfurized diester contains 10–30% by weight of chemically bound sulfur,
said reaction product containing 1–15% by weight of chemically bound sulfur and 10–30% by weight of chemically bound chlorine.

5. The reaction product produced by bubbling chlorine through a sulfurized di-n-hexyl methallylsuccinate formed by reacting
   (a) di-n-hexyl methallylsuccinate with
   (b) elemental sulfur at a temperature above 200° C. for a time sufficient to produce a substantial evolution of hydrogen sulfide whereby said sulfurized diester contains 10–30% by weight of chemically bound sulfur,
said reaction product containing 1–15% by weight of chemically bound sulfur and 10–30% by weight of chemically bound chlorine.

6. The reaction product produced by bubbling chlorine through a sulfurized diisobutyl dodecenylsuccinate formed by reacting
   (a) diisobutyl dodecenylsuccinate with
   (b) elemental sulfur at a temperature above 200° C. for a time sufficient to produce a substantial evolution of hydrogen sulfide whereby said sulfurized diester contains 10–30% by weight of chemically bound sulfur,
said reaction product containing 1–15% by weight of chemically bound sulfur and 10–30% by weight of chemically bound chlorine.

7. The reaction product produced by bubbling chlorine through a sulfurized 2-ethylhexyl tolyl dodecenylsuccinate formed by reacting
   (a) 2-ethylhexyl tolyl dodecenylsuccinate with
   (b) elemental sulfur at a temperature above 200° C. for a time sufficient to produce a substantial evolution of hydrogen sulfide whereby said sulfurized diester contains 5–30% by weight of chemically bound sulfur,
said reaction product containing 1–15% by weight of chemically bound sulfur and 10–30% by weight of chemically bound chlorine.

8. A lubricating oil composition comprising a petroleum distillate boiling about 325° C. and having a viscosity greater than 50 seconds Saybolt Universal at 38° C., and 0.1–15% by weight of a reaction product produced by bubbling chlorine through a sulfurized diester of an alkenylsuccinic acid formed by reacting
   (a) a diester of an alkenylsuccinic acid in which the ester radicals are derived from an alcohol selected from the group consisting of alkyl, alkoxyalkyl, alicyclic, aralkyl and aryl alcohols and the alkenyl radical contains at least 3 carbon atoms with (b) elemental sulfur at a temperature above 200° C. for a time sufficient to produce a substantial evolution of hydrogen sulfide whereby said sulfurized diester contains 5–30% by weight of chemically bound sulfur, said reaction product containing 1–15% by weight of chemically bound sulfur and 5–30% by weight of chemically bound chlorine.

9. A lubricating oil composition comprising a petroleum distillate boiling above 325° C. and having a viscosity greater than 50 seconds Saybolt Universal at 38° C., and 1–10% by weight of a reaction product produced by bubbling chlorine through a sulfurized dialkyl alkenylsuccinate formed by reacting (a) a dialkyl alkenylsuccinate in which the alkenyl radical contains at least 3 carbon atoms with (b) elemental sulfur at a temperature above 200° C. for a time sufficient to produce a substantial evolution of hydrogen sulfide whereby said sulfurized diester contains 10–30% by weight of chemically bound sulfur, said reaction product containing 1–15% by weight of chemically bound sulfur and 10–30% by weight of chemically bound chlorine.

References Cited by the Examiner
UNITED STATES PATENTS

| | | | |
|---|---|---|---|
| 2,251,932 | 8/41 | Harris et al. | 260—481 |
| 2,279,688 | 4/42 | Larsen | 252—48.6 |
| 2,433,853 | 1/48 | Lincoln et al. | 252—48.4 |
| 2,454,862 | 11/48 | Collins | 260—125 X |
| 2,496,508 | 2/50 | Watson et al. | 252—407 X |
| 2,883,317 | 4/59 | Heininger et al. | 260—481 X |
| 2,898,331 | 8/59 | Dorinson | 252—48.4 |
| 2,938,870 | 5/60 | Dorinson | 252—48.4 |
| 2,969,326 | 1/61 | Dorinson | 252—48.4 |
| 2,985,644 | 5/61 | Dorinson | 260—125 |

DANIEL E. WYMAN, *Primary Examiner.*

JULIUS GREENWALD, *Examiner.*

UNITED STATES PATENT OFFICE
CERTIFICATE OF CORRECTION

Patent No. 3,210,280                              October 5, 1965

Ernest J. Rich, Jr.

It is hereby certified that error appears in the above numbered patent requiring correction and that the said Letters Patent should read as corrected below.

Column 2, line 1, for "-octane" read -- -octene --; columns 7 and 8, the headings to the third column should appear as shown below instead of as in the patent:

| WEAR RESISTANCE |
| --- |
| Mean Specific Pressure, p.s.i. |
| 12,800 |
| After Chlorination | same table, the headings to the fourth, fifth, sixth and seventh columns should appear as shown below instead of as in the patent:

| LOAD CARRYING CAPACITY | | | |
| --- | --- | --- | --- |
| Applied Load at Weld, kg. | | Mean Hertz Load | |
| 89 | | 9.8 | |
| Before Chlorination | After Chlorination | Before Chlorination | After Chlorination | column 8, line 68, for "about" read -- above --.

Signed and sealed this 27th day of September 1966.

(SEAL)
Attest:

ERNEST W. SWIDER  
Attesting Officer

EDWARD J. BRENNER  
Commissioner of Patents